(12) United States Patent
Lumm et al.

(10) Patent No.: US 6,786,118 B1
(45) Date of Patent: Sep. 7, 2004

(54) METHOD AND FEED DEVICE FOR EFFECTING THE ADVANCE MOVEMENT OF AT LEAST ONE TOOL SUPPORT THAT ROTATES AROUND A ROTATIONALLY SYMMETRICAL PART

(75) Inventors: Michael Lumm, Bottrop (DE); Jürgen Sandkuhl, Weyhe (DE); Alfred Wagenfeld, Suestedt (DE)

(73) Assignee: Siemens Aktiengesellschaft, Munich (DE)

(*) Notice: Subject to any disclaimer, the term of this patent is extended or adjusted under 35 U.S.C. 154(b) by 86 days.

(21) Appl. No.: 10/019,551
(22) PCT Filed: Jun. 20, 2000
(86) PCT No.: PCT/DE00/01980
§ 371 (c)(1), (2), (4) Date: May 13, 2002
(87) PCT Pub. No.: WO01/00357
PCT Pub. Date: Jan. 4, 2001

(30) Foreign Application Priority Data

Jun. 24, 1999 (DE) .......................................... 199 29 712

(51) Int. Cl.$^7$ .............................. B23B 3/04; B23B 5/14; B23B 3/00; B23B 7/00
(52) U.S. Cl. .............................. 82/70.2; 82/72; 82/131; 82/141
(58) Field of Search ................................. 82/1.11, 70.2, 82/72, 128, 130, 131, 132, 141; 409/74, 78, 199; 475/5, 6, 11, 151, 154; 310/75 R, 112, 114

(56) References Cited

U.S. PATENT DOCUMENTS

| 2,769,234 A | * | 11/1956 | Young ............................ 30/97 |
| 3,908,491 A | | 9/1975 | Gilmore |
| 4,411,178 A | * | 10/1983 | Wachs et al. .................. 82/113 |
| 4,716,271 A | | 12/1987 | Hulsizer et al. |
| 5,189,933 A | * | 3/1993 | Ricci ............................ 82/113 |
| 5,605,083 A | * | 2/1997 | Lupke et al. ................... 82/67 |
| 5,894,772 A | * | 4/1999 | Nodar ........................... 82/113 |

FOREIGN PATENT DOCUMENTS

| DE | 38 16 307 C1 | 5/1988 |
| JP | 62287907 | 12/1987 |

OTHER PUBLICATIONS

Patent Abstract of Japan, 61062858, Mar. 31, 1986.

* cited by examiner

Primary Examiner—A. L. Wellington
Assistant Examiner—Brian D. Walsh
(74) Attorney, Agent, or Firm—Harness, Dickey & Pierce, PLC

(57) ABSTRACT

A method and apparatus for carrying out an advancing movement of a tool support rotating about a rotationally symmetric component, and an associated feed device, are described. The tool support is capable of being fed via a leadscrew, is supported on a component, and is driven in rotation as a whole by a stationarily mounted main motor via a main transmission mechanism connected firmly to a support of the tool support.

17 Claims, 1 Drawing Sheet

METHOD AND FEED DEVICE FOR EFFECTING THE ADVANCE MOVEMENT OF AT LEAST ONE TOOL SUPPORT THAT ROTATES AROUND A ROTATIONALLY SYMMETRICAL PART

This application is the national phase under 35 U.S.C. § 371 of PCT International Application No. PCT/DE00/01980 which has an International filing date of Jun. 20, 2000, which designated the United States of America, the entire contents of which are hereby incorporated by reference.

FIELD OF THE INVENTION

The present invention generally relates to working machines, and more particularly to feed devices that act on components.

BACKGROUND OF THE INVENTION

The machining of large machine shafts, for example turbine and generator shafts, requires special lathes for which large machine sheds are necessary. For working on site, for example for machining the bearing seats during repair by lathe-turning, grinding or polishing, it would be desirable to carry out machining by way of nonstationary machines which can be placed onto the stationary shaft, so that extensive and costly demounting and transport work could be avoided. Even possible damage to the shaft as a result of transport to the place of use itself and also during subsequent installation work often make additional work on the shaft desirable.

For uses on smaller shafts, lathes are already known which are placed onto a shaft and rotate around the shaft. The problem of such machining appliances is the generation of advance movements for the machining tools in a longitudinal direction and transversely to the shaft. Separate drives which corotate with the lathe have to be used for generating the advancing movements. Apart from the large mass which has to be moved and supported in this way, thus causing vibrations which lead to machining inaccuracies, such an arrangement has further disadvantages. The energy for these drives has to be transmitted to the rotating drives by way of slip rings. The working machine must therefore have an unsplit design, since the slip rings would otherwise also have to be split, but power transmission via split slip rings would present considerable technical difficulties.

It is desirable, by contrast, for a working machine to be designed to be splittable in order to be placed onto a correspondingly large shaft and for the working machine to be assembled for a machining operation on the shaft, though without requiring power transmission via split slip rings. Moreover, the rotating mass is to be kept as small as possible.

A feed device is disclosed in JP-A 62287907, in which the drives for the advancing movements are likewise arranged at a fixed location. The advancing movements take place via the relative movement of a further transmission mechanism cooperating with the respective leadscrew, in addition to the main transmission mechanism. These transmission mechanisms are connected to the main transmission mechanism in each case via a planetary gear, the planet wheels of which can be additionally driven or braked by rest motors and consequently bring about the relative movement. The solution has the disadvantage that planetary gears of this type are highly cost-intensive, and that, particularly in the case of run-on and run-off ramps, internal forces occur which lead to unintended relative movements of the main drive and advancing drive and consequently to unintended adjustments of the machining tools.

SUMMARY OF THE INVENTION

An object on which the present invention is based is to specify a method for carrying out the advancing movement and a feed device for a working machine with a rotating tool support the method and the feed device allowing machining (lathe-turning, milling, orbital grinding) in NC quality.

The object is achieved by exemplary non-limiting embodiments of the present invention.

The advancing movement of the tools is generated in that transmission mechanisms are provided, which drive the leadscrews of the tool supports and are themselves driven at a different speed from the working machine which rotates as a whole; the relative speed between the two then takes effect.

If the relative speed is zero, no advancing movement takes place.

Preferably, a plurality of large gear rings are provided as transmission mechanisms between the drive motors and the working machine. One of these gear rings is provided for rotating the entire working machine and consequently also determining the cutting speed of a tool with respect to the shaft, while the other gear ring, or gear rings, serves for the advancing movements of the tools.

When all the gear rings rotate at the same speed, no movement takes place on the cross slide and longitudinal slide supports. Only when the gear rings for the supports for longitudinal and cross movement run more quickly or more slowly than the gear ring driving the working machine, is there a rotation of the leadscrews and therefore an advance of the supports in relation to the working machine on account of the relation movement between the gear rings. It is therefore necessary to drive the support motors, which act on the individual gear rings, more quickly or more slowly than the gear ring for the working machine when an advancing movement is to be brought about.

There is a drive motor in each case for driving the gear ring of the rotating working machine and that of the leadscrews. In order to drive all the gear rings synchronously with the main motor in an operating phase in which no advancing movement is to take place, according to the present invention, a mechanical coupling of the main motor to the support motors is provided; for example, via toothed belts, via which the housings of the support motors are taken up by the main motor. Specifically, in the case described here, at the same rotational speed, the shafts of the support motors, which are not themselves driven in this operating phase, also being taken up at the same rotational speed and driving the gear rings for the leadscrew movement, so that there is no movement of these gear rings in relation to the gear ring which brings about the rotational movement of the entire working machine. In order at the same time to rule out the effect of internal forces in the working machine, each support motor is expediently braked in this operating phase.

All the drive motors are arranged at a fixed location, for example directly on the stationary shaft or on a block standing next to the shaft. In this case, the tools controlled by the leadscrews rotate together with the working machine, without executing a relative movement perpendicularly to or along the shaft, as long as the rotational speed of the motor shaft of one or both support motors is not changed in relation to the rotational speed of the driving main motor. Only when, as a result of the switched-on specific drive movement of one of the support motors, one leadscrew or another rotates more quickly or more slowly than the working machine, about the shaft to be machined, is there a movement of the tool or tools in relation to the shaft. The supply of power to the support motors, the housings of which are fixed in place, but rotate at the same rotational speed as the main motor, takes place via slip rings. The voltage supplied via the slip rings determines the rotational speed of the respective support motor and consequently the advancing speed.

Instead of lathe tools, other tools may also be used for machining the shaft surface, such as, for example, grinding wheels, milling cutters or polishing devices.

It is assumed above that all the gear rings and the pinions driving the gear rings have the same diameters and numbers of teeth, and the main motor and the housings of the support motors have the same rotational speed. This is certainly the most practical solution. It is also possible, however, to use gear rings with different diameters, when the pinions likewise have different diameters and/or the rotational speeds of the motors are not identical. It is important merely that, in the operating state in which no advancing movement is to take place, all the gear rings are driven at the same rotational speed.

The solution has the advantage that the working machine may have a split design. All the drive motors are to be arranged at a fixed location, and the support motors do not corotate with the entire machine, but only independently. The rotating mass is therefore also kept small. The power transmission to the support motors may be carried out via unsplit slip rings. A simple and accurate control of the tool supports becomes possible, even in the case of run-on and run-off ramps, and during curve machining of a component to be machined. That is to say surfaces, diameters and curves may be machined, programmed, by way of the NC technique, as in conventional machine tools.

BRIEF DESCRIPTION OF THE DRAWINGS

The invention will be explained in more detail below with reference to an exemplary embodiment. In the accompanying drawings.

DETAILED DESCRIPTION OF THE PREFERRED EMBODIMENTS

Figure 1:
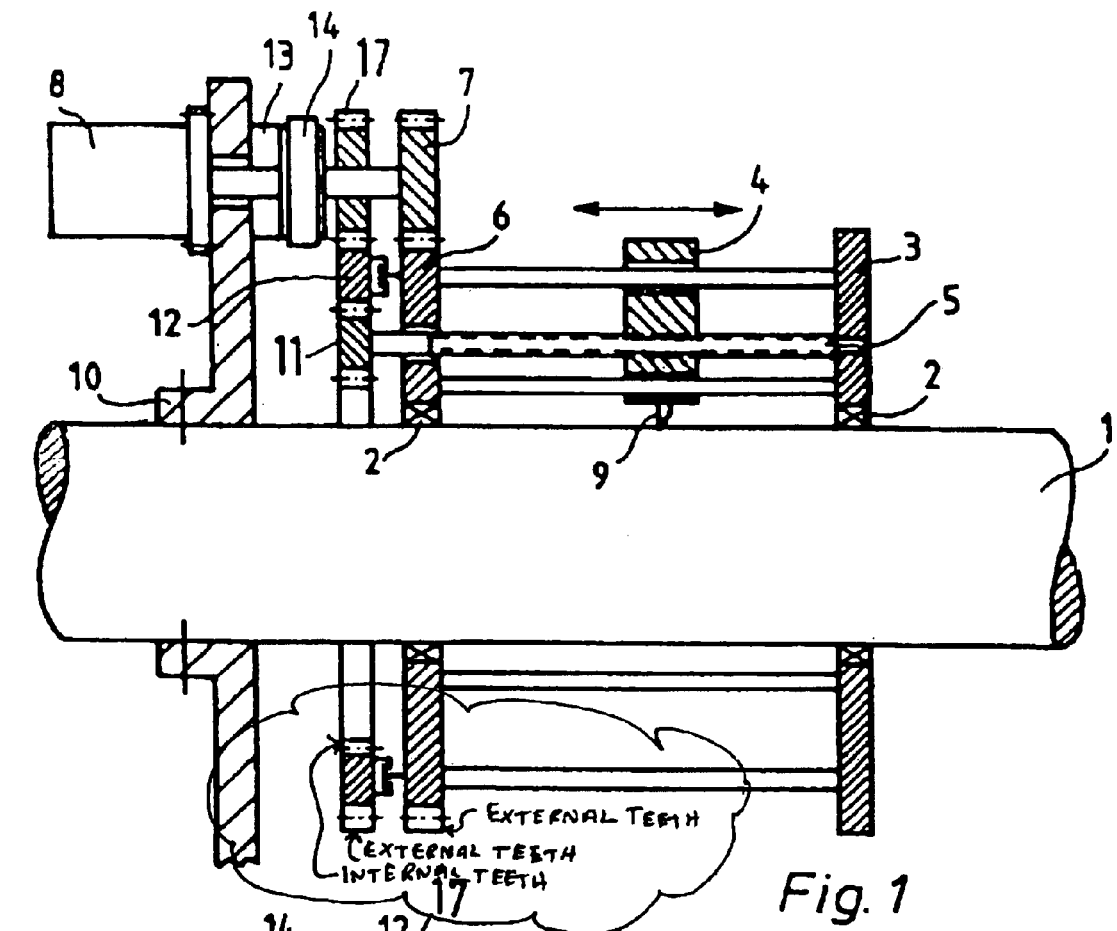
FIG. 1 shows a diagrammatically illustrated side view of a working machine according to the present invention.
Figure 2:
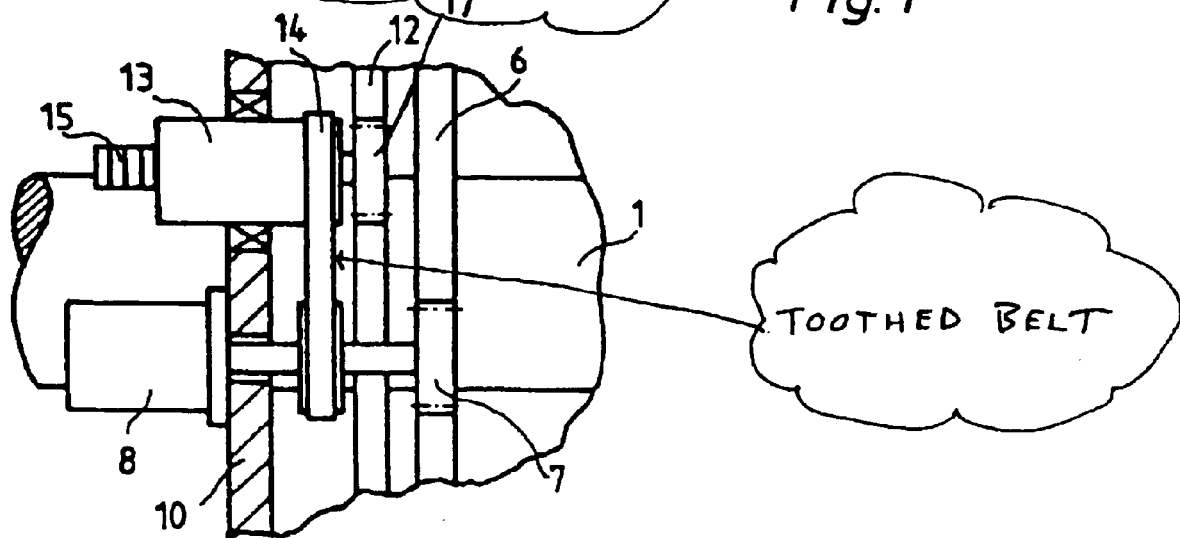
FIG. 2 shows a top view of the driving side of the working machine according to FIG. 1.

For the sake of clarity, the exemplary embodiment is preferably an arrangement with two gear rings. That is to say, one gear ring for driving the working machine, and one gear ring for driving a leadscrew for the longitudinal advancing movement of a support. In a practical embodiment of the present invention, at least one third gear ring will be provided for carrying out a second advancing movement of the tool. The embodiments described herein are hereby illustrated in the present invention.

A working machine is placed onto a shaft 1 to be machined and is supported in a rotationally movable manner on the latter by way of bearings 2. The working machine includes a frame support 3, in which is mounted a tool support 4 that may execute an advancing movement in the longitudinal direction of the shaft 1 via a leadscrew 5. The frame support 3 is designed on the driving side as an externally toothed gear ring 6. Via a pinion 7 on the motor shaft of a main motor 8, the gear ring 6, and therefore also the tool support 4, is driven, so that the latter rotates together with its tool 9, for example a lathe tool, about the shaft 1. The main motor 8 is in this case fastened on the shaft 1 via a support 10.

The leadscrew 5 is rotatable in the frame support 3 via a pinion 11 and moves the tool rest 4 back and forth via a worm drive. The pinion 11 is itself driven by an internally and externally toothed gear ring 12 which is mounted rotatably on the frame support 3. As long as the gear rings 6 and 12 do not execute any movement in relation to one another, the tool rest 4 remains in its position, that is to say no advance is brought about. For this purpose, assuming the same number of teeth of a pinion 17 and pinion 7 and of the gear rings 6 and 12, the pinion 17 must be driven at the same rotational speed as the pinion 7. This is carried out by the housing of a support motor 13, on the motor shaft of which the pinion 17 is arranged, being mounted rotatably and rotating with the same rotational speed as the main motor 8 or the pinion 7, the housing taking up the pinion 11 at this rotational speed. In order to bring about rotation and at the same time ensure full synchronism of the two drive movements, the main motor 8 is coupled mechanically to the housing of the support motor 13 via a toothed belt 14.

In order, in an operating phase without an advancing movement, not to allow any rotational speed of the pinion 17 which deviates from the rotational speed of the housing of the support motor 13, the support motor 13 is expediently braked, so that the housing and the motor shaft of the support motor 13 are coupled. In contrast to this, for an advancing movement of the tool rest 4, the brake is released and the support motor 13 is additionally driven itself. This takes place via the supply of power to slip rings 15 on the support motor 13. When the Support motor 13 is put into operation, the pinion 17, and consequently the gear ring 12, is additionally driven in one direction or braked in the other direction beyond the rotation that is imparted by the housing of the support motor 13. A movement of the gear rings 6 and 12 in relation to one another thus takes place, these gear rings bringing about a rotation of the leadscrew 5 and consequently an advance of the tool rest 4.

Since the support motor 13, together with its slip ring set, is arranged at a fixed location, the frame support 3 can have a split design, so that it can be placed onto the shaft 1 anywhere on the latter.

As can easily be seen, a further advancing movement radially relative to the shaft 1 can be achieved by way of a second support motor and a third gear ring and also a conventional deflection mechanism on the tool rest. If further rest drives are also necessary, these can be implemented in the same way.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A feed device for a working machine for surface machining of a rotationally symmetric component, comprising:
   a stationarily mounted main motor having a main transmission mechanism;
   at least one tool support receiving a drive movement from the main transmission mechanism and which rotates about the component;
   at least one leadscrew for actuating the at least one tool support;

a support mounting, on the component, for supporting at least the at least one tool support; and a support motor having a further transmission mechanism for driving at least the at least one leadscrew, wherein a housing of the support motor is mounted rotatably and is coupled mechanically to the main motor, the support motor being capable of being driven synchronously in rotation by the main motor.

2. The feed device as claimed in claim 1, wherein the main transmission mechanism is an externally toothed gear ring driven by a pinion seated on a motor shaft of the main motor.

3. The feed device as claimed in claim 2, wherein the support motor is a brake motor.

4. The feed device as claimed in claim 2, wherein the further transmission mechanism is an externally and internally toothed gear ring driven by a pinion seated on a motor shaft of the support motor.

5. The feed device as claimed in claim 2, wherein the main motor is coupled mechanically to the housing of the support motor via gearwheel mechanisms.

6. The feed device as claimed in claim 1, wherein the main transmission mechanism is an externally toothed gear ring driven by a motor shaft of the main motor via a toothed belt.

7. The feed device as claimed in claim 6, wherein the support motor is a brake motor.

8. The feed device as claimed in claim 6, wherein the further transmission mechanism is an externally and internally toothed gear ring driven by the motor shaft of a support motor via a toothed belt.

9. The feed device as claimed in claim 1, wherein the further transmission mechanism is an externally and internally toothed gear ring driven by a pinion seated on a motor shaft of the support motor.

10. The feed device as claimed in claim 9, wherein the support motor is a brake motor.

11. The feed device as claimed in claim 1, wherein the further transmission mechanism is an externally and internally toothed gear ring driven by the motor shaft of a support motor via a toothed belt.

12. The feed device as claimed in claim 11, wherein the support motor is a brake motor.

13. The feed device as claimed in claim 1, wherein the further transmission mechanism is mounted rotatably on a support of the main motor.

14. The feed device as claimed in claim 2, wherein the further transmission mechanism is mounted rotatably on the support mounting of the tool support.

15. The feed device as claimed in claim 1, wherein the main motor is coupled mechanically to the housing of the support motor via toothed belts.

16. The feed device as claimed in claim 1, wherein the main motor is coupled mechanically to the housing of the support motor via gearwheel mechanisms.

17. The feed device as claimed in claim 1, wherein the support motor is a brake motor.

* * * * *